J. M. WHEELER.
Cuspadore.

No. 225,774. Patented Mar. 23, 1880.

Attest:
T. Walter Fowler,
Jno. L. Condron.

Inventor:
John M. Wheeler
per Attys.
A. H. Evans & Co.

N. PETERS, PHOTO-LITHOGRAPHER, WASHINGTON, D. C.

UNITED STATES PATENT OFFICE.

JOHN M. WHEELER, OF TOLEDO, OHIO.

CUSPADORE.

SPECIFICATION forming part of Letters Patent No. 225,774, dated March 23, 1880.

Application filed February 18, 1880.

*To all whom it may concern:*

Be it known that I, JOHN M. WHEELER, of Toledo, State of Ohio, have invented a new and useful Improvement in Cuspadores; and I declare the following to be a full, clear, and exact description thereof, reference being had to the accompanying drawings, forming part of the specification, in which—

Figure 1:
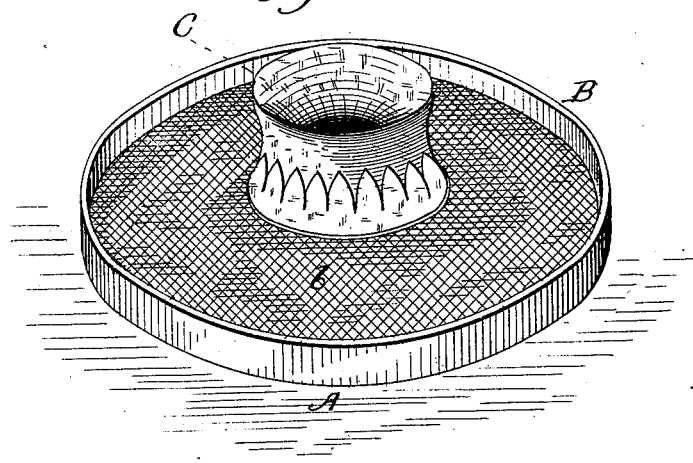
Figure 2:
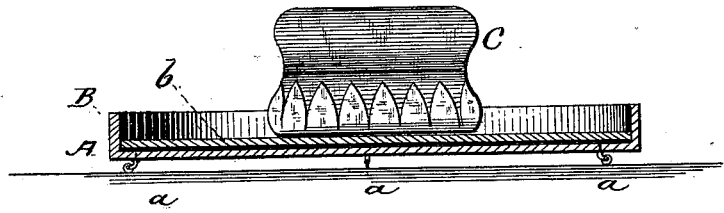

Figure 1 is a perspective view of my invention. Fig. 2 is a vertical section of the same.

My invention relates to that class of cuspadores which are placed on the floors of rooms, and which are to be moved about as occasion demands; and it consists in the combination of devices hereinafter described and claimed.

In order that others skilled in the art may make and use my invention, I will proceed to describe the exact manner in which I have carried it out.

In the drawings, A represents an independent base provided with rollers $a\ a$, whereby it may be easily moved from place to place. The base has also the rim B, of sufficient height to catch and hold the contents of the basin C in the event of the latter becoming upset.

The basin may be made of any desired shape or pattern, and rests on the base A, as shown in Fig. 1. Between the base and the basin may be interposed a mat, $b$, to facilitate the cleaning of the cuspadore.

It is evident from this construction that my improved cuspadore may be readily moved over the floor, and in case of accident from upsetting the basin the contents will be caught on the base, and the whole can be readily cleaned by removing the basin from its base and washing the parts separately. They may be made very ornamental, if desired.

I am aware it is not new to place rollers under cuspadores, nor is it new to make them with a permanent or rigid base larger than the basin portion, and these I do not claim.

Having thus explained my invention, what I claim as new, and desire to secure by Letters Patent, is—

1. The improved cuspadore constructed as described, and consisting of the independent base A and rim B, in combination with the basin C, all constructed and arranged substantially as and for the purpose set forth.

2. The improved cuspadore constructed as described, and consisting of the independent base A, provided with the rollers $a\ a$, and rim B, in combination with the basin C, all constructed and arranged substantially as and for the purpose set forth.

JOHN M. WHEELER.

Witnesses:
 A. H. EVANS,
 R. K. EVANS.